Feb. 18, 1930.        J. V. N. DORR ET AL        1,747,759
PROCESS FOR THE MANUFACTURE OF SODIUM ALUMINATE
Filed Feb. 11, 1925
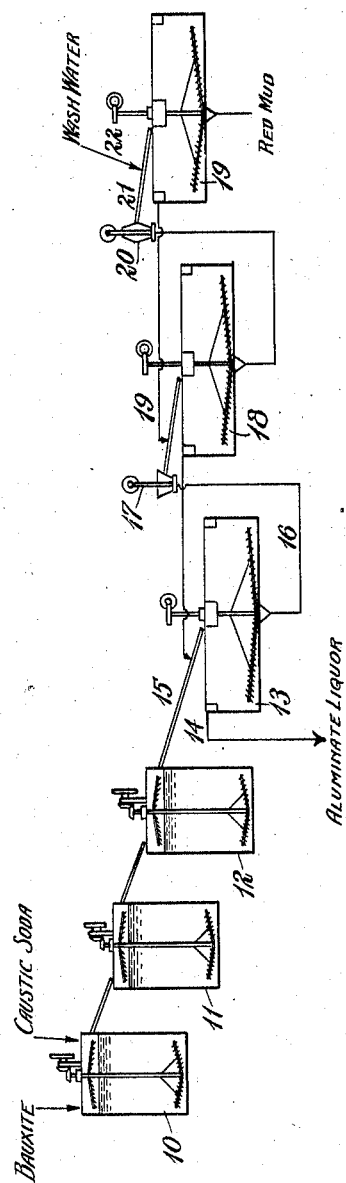
JOHN V.N. DORR
HAROLD N. SPICER
GEORGE M. DARBY
ARTHUR TERRY JR.
INVENTOR
BY
ATTORNEY Patented Feb. 18, 1930

1,747,759

UNITED STATES PATENT OFFICE

JOHN V. N. DORR, OF NEW YORK, N. Y., GEORGE M. DARBY, OF WESTPORT, CONNECTICUT, AND ARTHUR TERRY, JR., AND HAROLD N. SPICER, OF NEW YORK, N. Y., ASSIGNORS TO THE DORR COMPANY, OF NEW YORK, N. Y., A CORPORATION OF DELAWARE

PROCESS FOR THE MANUFACTURE OF SODIUM ALUMINATE

Application filed February 11, 1925. Serial No. 8,327.

This invention relates to the production of sodium aluminate by treatment of bauxite with caustic soda or its equivalent, and is in general an improvement of the earlier steps of the Bayer process for manufacturing alumina. These steps comprise, first, digestion of the bauxite with hot caustic liquor; second, separation of the insoluble residue or red mud from the resulting sodium aluminate liquor; and third, treatment of the separated red mud to recover residual aluminate therefrom.

In actual practice the chemical and physical requirements for the efficient operation of these steps are very exacting, owing to peculiar characteristics of the substances involved. The chief difficulty is due to the instability of the sodium aluminate, which has a strong tendency to break down or decompose into insoluble aluminum hydroxide and caustic soda.

An important object of this invention is the control of certain factors which affect the decomposition of the aluminate, the effect of which heretofore has not been thoroughly understood. These factors comprise the temperature, concentration, molecular ratio of $Na_2O$ to $Al_2O_3$ and agitation; and by regulating these factors separately and in their relation to each other the tendency of the hydroxide to decompose prematurely can be reduced to a minimum, and improved methods for the separation and washing of the red mud may be employed.

In particular, an object of the invention is to employ sedimentation and decantation for the separation of the red mud from the sodium aluminate liquor from the digestion step, an operation which is feasible under commercial conditions only by suitable control of the factors governing decomposition. A further object is the employment of sedimentation and decantation methods for recovering the residual aluminate from the red mud. Each of these operations involves somewhat different problems in connection with the prevention of decomposition, and requires somewhat different treatment, as will be hereinafter set forth in detail.

In present commercial practice the digestion step is carried on under high pressure and at temperatures substantially above the atmospheric boiling point of the mix. According to this invention the digestion may be carried out at atmospheric pressure and at temperatures below the boiling point, at a substantial saving, by the employment of continuous digestion apparatus of a suitable type as hereinafter indicated. Furthermore, it has heretofore been considered necessary to employ batch methods in the steps above indicated owing to the difficulty in applying continuous methods under the critical conditions indicated. An important object is to employ improved control methods and a special type of apparatus whereby each step may be made continuous, and the various steps may be connected in a complete continuous operation with notable improvements in efficiency, accuracy of control and saving of labor.

Other objects of the invention will be apparent from the following description taken in connection with the accompanying drawing, which shows a diagrammatical flow sheet illustrative of one suitable arrangement of apparatus for putting the invention into practice.

For efficient digestion the bauxite should be ground relatively fine, preferably minus 100 mesh; and the caustic soda should be as highly concentrated as is possible without interfering with mechanical handling during digestion. The proportion of bauxite and caustic soda employed should be carefully regulated so that the molecular ratio of $Na_2O$ to $Al_2O_3$ is between 1.6 to 1 and 2.4 to 1; and preferably is reasonably close to 2 to 1. The temperature during digestion should also be relatively high, preferably between 195° Fahrenheit and a point just below the boiling point of the mix, though lower temperatures may be used with a decrease in digestion efficiency, temperatures as low as 190° Fahrenheit having been used successfully.

For carrying out the digestion operation continuous agitators operating at atmospheric pressure are employed. It has been found that digestion is more rapid and complete and the product is substantially more uniform where digestion takes place in digesters which do not employ violent agitation. For this purpose circulation agitators such as the well known Dorr type are particularly suitable, since the mix is taken from the digester bottom, elevated in a lift column and distributed evenly over the surface of the fluid in the tank. For efficient operation, in which a suitable retention period is combined with a proper rate of circulation in the agitator, digestion preferably is carried on in a series of Dorr agitators. In the example illustrated in the drawing the bauxite and caustic soda solution are simultaneously continuously introduced into a Dorr agitator 10, passing successively into agitators 11 and 12, the latter discharging continuously the digested liquor mixed with the insoluble red mud. By providing suitable insulation the temperature during digestion may be maintained sufficiently close to that of the initial feed without auxiliary heating devices; though the latter may be employed in well known manner if desired. Operating at atmospheric pressure under the conditions indicated efficient extraction may be obtained in from fourteen to eighteen hours; though this period may be reduced to cut down the amount of sodium silicate taken into solution, as under certain circumstances it is considered preferable to sacrifice extraction in order to minimize the amount of silicate in solution. Under such conditions the digestion at atmospheric pressure and at temperatures below those generally employed commercially is advantageous, owing to the reduced tendency of the silicate to go into solution.

The discharge from the last digester 12 comprises a solution of sodium aluminate carrying a substantial amount of very fine insoluble matter in suspension. These suspended solids, commercially referred to as red mud, are very fine and slimy; and owing to the necessity for preventing substantial decomposition during the removal of the red mud, which under conditions as heretofore known required the maximum practical speed in the removal process, the mud has under commercial conditions been removed by filters. This arrangement is highly unsatisfactory, however, since hot slimy mud is at best difficult to filter. Furthermore, the variations in temperature unavoidable when filtration is employed cause some decomposition, the hydroxide lodging in the filter cloths and requiring frequent cloth changes. This method of operation has involved considerable expense for cloths, labor and production loss during cloth change, or the expense of surplus units; and the conditions attending operation of the filter presses are very disagreeable. Nevertheless, those skilled in the art have preferred these conditions to the extensive decomposition which would occur with any other process of mud removal so far as has heretofore been known.

According to this invention the red mud may be removed by sedimentation and decantation where certain factors are regulated. A principal factor is the maintenance of a high and relatively uniform temperature during the settling operation. In order to obtain sedimentation at a commercially practicable rate the digestion product must be substantially diluted; but the extent of dilution must be carefully controlled, since there is a concentration, which varies with the temperature, below which substantial decomposition will occur, but above which the amount of decomposition is negligible during the period necessary for sedimentation. Decomposition is further minimized where a continuous sedimentation and decantation unit is employed, since a uniform minimum retention period can be provided and a proper control of temperature assured. Dorr settling apparatus of any standard type is eminently suited for the purpose; and in the illustration there is shown a Dorr thickener 13 which receives the effluent from digester 12, the thickener overflowing at 14 the clarified sodium aluminate liquor ready for the decomposers. The settled red mud is propelled to a discharge point in the bottom of the thickener and removed therefrom in the usual manner. This unit can readily be insulated very effectively, and only a very few degrees of temperature will be lost during passage through the unit.

A convenient method of diluting the feed to thickener 13 comprises the continuous introduction into the feed channel 15 of a stream of diluent, preferably heated to maintain the temperature of the digestion product, and at a rate which will reduce the concentration of the thickener feed to a point as low as possible without excessive decomposition. In practice a concentration of from 25 to 30° Baumé has been found suitable, though dilutions between 24° and 35° Bé. may be used. The diluent may conveniently comprise wash water from the red mud washing system hereinafter described, as this water will be at a suitable temperature; but obviously other arrangements for introducing a diluent may be employed.

The settled red mud in the thickener 13 may be removed from the bottom of the thickener through a suction line 16 connected to pump 17 which should be of the constant volume displacement type, a diaphragm pump being suitable for the purpose. While either intermittent or constant mud removal is practical, it is preferable to withdraw the mud continuously for convenience in maintaining a balanced continuous system, and to minimize any tendency of sodium aluminate entrapped with mud to decompose.

The residual sodium aluminate in the underflow from thickener 13 is removed by dilution, sedimentation and decantation, a method of operation which in practice requires more or less substantial detention periods where the solids do not settle with great rapidity. However, by control of temperature and dilution under the conditions indicated this method of washing the red mud may be employed efficiently. It is preferred to employ a plurality of decantation units such as Dorr thickeners 18 and 19, through which the solids pass in succession, the decanted wash water traveling through the series in reverse direction. It will of course be understood that any desired number of units may be employed and that the operation may be carried out in one unit.

In the example shown in the drawing pump 17 discharges the mud from thickener 13 into washing thickener 18 through channel 19, into which the overflow from thickener 19 is introduced so that the feed to thickener 18 has a relatively low concentration, which should be below 18° Baumé and is preferably below 15° Baumé. It has been found that by diluting the aluminate in the mud to this point, the tendency to decompose which exists at higher concentrations is avoided; and this condition is materially assisted by suitably insulating the thickeners in the washing series.

The underflow from thickener 18 is withdrawn by pump 20 in similar manner and is discharged into washing thickener 19 through channel 21 into which wash water is introduced at 22 at the rate which will produce an overflow adequate to provide the necessary dilutions in the feed to thickeners 13 and 18 as heretofore indicated. The wash water may be heated and the tank insulated to maintain the conditions of temperature necessary to prevent decomposition. The settled solids are discharged from the bottom of tank 19 in any desired manner, and comprise the washed red mud.

It will be understood that while continuous operation and suitable insulation, together with introduction of the feed and wash water to the system at suitable temperatures, will maintain the heat necessary for efficient operation, suitable auxiliary heating means may be employed, preferably between the units to prevent convection currents which would be detrimental to efficient operation.

While for convenience and clearness of description certain definite chemical substances have been mentioned, it will be understood that this invention covers the full range of chemical equivalents and substitutions known to those skilled in the art.

I claim:

1. In a process for the manufacture of sodium aluminate by digestion of bauxite with a caustic soda solution, the step which comprises the separation of solids from the fluid in the digestion product by sedimentation and decantation while maintaining said product throughout the separation step at a temperature above 195° Fahrenheit.

2. In a process for the manufacture of sodium aluminate by digestion of bauxite with a caustic soda solution, the step which comprises the separation of solids from the fluid in the digestion product by sedimentation and decantation while maintaining said product at a concentration above that at which substantial decomposition occurs.

3. In a process for the manufacture of sodium aluminate by digestion of bauxite with a caustic soda solution, the step which comprises the separation of solids from the fluid in the digestion product by sedimentation and decantation while maintaining said product at a concentration between 24 and 35° Baumé.

4. In a process for the manufacture of sodium aluminate by digestion of bauxite with a caustic soda solution, the step which comprises the separation of solids from the fluid in the digestion product by sedimentation and decantation, said product being maintained at a temperature and concentration above the temperature and concentration range at which substantial decomposition occurs.

5. In a process for the manufacture of sodium aluminate by digestion of bauxite with a caustic soda solution, the step which comprises the separation of solids from the fluid in the digestion product by sedimentation and decantation, the product being maintained above 190° Fahrenheit and at a concentration between 24 and 35° Baumé.

6. In a process for the manufacture of sodium aluminate the digestion of bauxite with highly concentrated caustic soda solution, dilution of the digestion product to a concentration above that at which substantial decomposition occurs, and separation of solids from the fluid in the diluted product by sedimentation and decantation.

7. In a process for the manufacture of sodium aluminate, the digestion of bauxite with highly concentrated caustic soda solution, dilution of the digestion product to a concentration above 24° Baumé, and separation of solids from the liquid in the diluted product by sedimentation and decantation.

8. In a process for the manufacture of sodium aluminate, continuous digestion of bauxite with highly concentrated caustic soda solution, continuous dilution of the digestion product to a concentration above that at which substantial decomposition occurs, and continuous separation of solids from the fluid in the digestion product by sedimentation and decantation.

9. In a process for the manufacture of sodium aluminate, continuous digestion of bauxite with highly concentrated caustic soda solution at atmospheric pressure; continuous dilution of the digestion product to a concentration above that at which substantial decomposition occurs, and continuous separation of the solids from the fluid in the digestion product by sedimentation and decantation.

10. In a process for the manufacture of sodium aluminate, the step which comprises extraction of residual sodium aluminate from the solids removed from the digestion product, by dilution to a concentration below that at which substantial decomposition occurs, and subsequent sedimentation and decantation.

11. In a process for the manufacture of sodium aluminate, continuous digestion of bauxite with highly concentrated caustic soda solution at atmospheric pressure; continuous dilution of the digestion product to a concentration above that at which substantial decomposition occurs, and continuous separation of the solids from the fluid in the digestion product by sedimentation and decantation at a temperature above that at which substantial decomposition occurs.

12. In a process for the manufacture of sodium aluminate by digestion of bauxite with a caustic soda solution, the steps which comprise the separation of solids from the fluid in the digestion product by sedimentation and decantation while maintaining the product at a concentration above that at which substantial decomposition occurs, and the extraction of residual sodium aluminate from said separated solids by dilution to a concentration below that at which substantial decomposition occurs, followed by sedimentation and decantation.

13. In a process for the manufacture of sodium aluminate by digestion of bauxite with highly concentrated caustic soda solution, separation of solids from the fluid in the digestion product by sedimentation and decantation, extraction of residual sodium aluminate from the separated solids by dilution, sedimentation and decantation, and dilution of the digestion product prior to removal of the solids therefrom to a concentration above that at which substantial decomposition occurs, with the fluid decanted from the extraction step.

14. In a process for the manufacture of sodium aluminate, digestion of bauxite with highly concentrated caustic soda solution; continuous separation of solids from the fluid in the digestion product by continuous sedimentation and decantation; continuous extraction of residual sodium aluminate from the separated solids by dilution, sedimentation and decantation; and continuously diluting with the liquid from the last decantation step the digestion product to a concentration above that at which substantial decomposition occurs.

15. A continuous process for the manufacture of sodium aluminate comprising continuous digestion of bauxite with a concentrated caustic soda solution at atmospheric pressure; continuous separation of solids from the fluid in the digestion product by continuous sedimentation and decantation at a temperature above that at which substantial decomposition occurs; continuous extraction of residual sodium aluminate from the separated solids by continuous dilution, sedimentation and continuous decantation, and continuous dilution of the digestion product with the fluid decanted in the preceding step to a concentration above that at which substantial decomposition occurs, prior to removal of the solids therefrom by sedimentation.

Dated Feb. 7, 1925.

JOHN V. N. DORR.
HAROLD N. SPICER.
ARTHUR TERRY, Jr.
GEORGE M. DARBY.